Patented Nov. 10, 1942

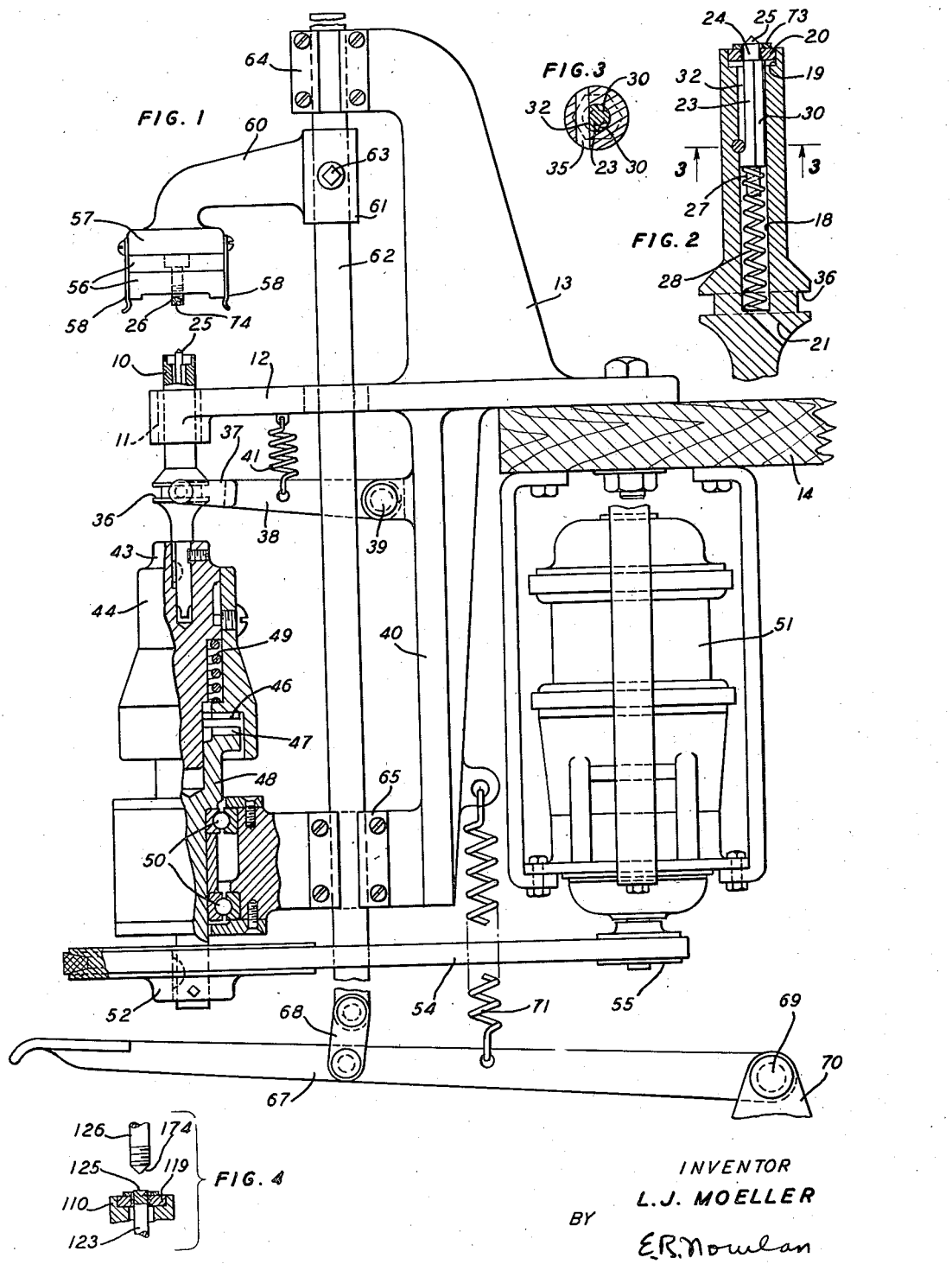

2,301,438

UNITED STATES PATENT OFFICE 2,301,438

ASSEMBLING MACHINE

Lowell J. Moeller, Towson, Md., assignor to Western Electric Company, Incorporated, New York, N. Y., a corporation of New York Application February 7, 1940, Serial No. 317,664

3 Claims. (Cl. 81—54)

This invention relates to assembling machines, and more particularly to machines for assembling nuts and washers on bolts.

In the art of assembling machines, particularly machines for assembling nuts and washers on bolts, one of the most difficult problems to solve in order to assure efficient results and avoid damage to the parts assembled, is the assurance of accurate centering and aligning of the washer, and particularly the nut with the bolt. If the parts are not accurately centered or properly aligned, the threads of the nut and/or the bolt may be damaged, thus preventing proper assembling of the parts, weaken their holding force one with the other, render the parts difficult to disassemble, and also render the parts undesirable for repeated use.

An object of the invention is to provide assembling machines simple in construction and accurately dependable in centering and aligning parts such as nuts and washers with bolts for the assembling thereof.

With this and other objects in view, the invention comprises an assembling machine having a wrench recessed to receive a nut and washer with a centering element concentric with the recess and having its outer end of a contour to interengage a bolt removably supported by a movable holding element to center the bolt with the nut in the wrench when the holding element is moved into engagement therewith.

Other objects and advantages will be apparent from the following detailed description when taken in conjunction with the accompanying drawing, wherein Fig. 1 is a side elevational view of one species of the invention, portions thereof being shown in section;

Fig. 2 is an enlarged fragmentary vertical sectional view of the wrench;

Fig. 3 is a horizontal sectional view taken along the line 3—3 of Fig. 2, and

Fig. 4 is a fragmentary sectional view illustrating another species of the invention.

Referring now to the drawing, particularly Figs. 1, 2 and 3, it will be observed that a wrench 10 is held against lateral movement but mounted for vertical as well as rotary movement in a bearing 11 disposed in a laterally extending arm 12 of a supporting bracket 13, the latter being rigidly mounted upon a suitable table or support 14. The upper portion of the wrench, as illustrated in Fig. 2, is provided with a longitudinally extending aperture 18 communicating at the upper end thereof with a recess 19 of a desired contour, to receive a nut 20 and communicating at its lower end with an angularly extending outlet 21 extending through the body of the wrench to permit particles to escape therethrough. A centering element 23, disposed in the aperture 18, has an outer portion 24 provided with an end of a suitable contour, which in the present instance is conical as illustrated at 25, for interengagement with an end of a bolt 26, as will hereinafter be described. The inner end 27 of the centering element is reduced in diameter to fit within the compression spring 28 disposed in the aperture beneath the centering element. The portion of the centering element between the ends 24 and 27 has spaced longitudinal grooves 30 extending the full length of this portion, providing passageways for dust or other particles which might enter the recess 19, thus completing passageways from the recess 19 through the grooves 30, the aperture 18, and through the outlet 21. The side of the centering element opposite the grooves 30 is flattened, as at 32, for the major portion of its length, cooperating with a pin 35 positioned in an aperture in the wrench to permit longitudinal movement of the centering element but to eliminate possibility of rotation thereof. The unflattened portion of the centering element forms an abutting shoulder for engagement with the pin 35 to limit the upward movement of the centering element.

In an outwardly flared central portion of the wrench an annular groove 36 is formed for interengagement with a yoke end 37 of a lever 38. The lever 38 is pivotally supported, at 39, on a downwardly projecting arm 40 of the bracket 13 and is normally urged upwardly or clockwise about its pivot by a spring 41. With this mechanism the wrench is returned to and normally held in its upper position.

The lower end of the wrench is removably mounted in a chuck 43 of a clutch unit 44. In the present embodiment the clutch unit includes teeth 46 of a driven member conditioned to interengage teeth 47 of a driving member 48 normally held against interengagement by a spring 49. The driving member 48 is rotatably supported in bearings 50 mounted in a horizontally extending portion of the arm 40 of the bracket 13, the lower end of the driving member being operatively connected to a rotating means such as motor 51 through pulleys 52 and 53 and a belt 54.

The bolt 26 in the present instance is shown loosely mounted in articles 56 which are to be joined together. Suitable means, such as a support 57 in the form of a movable head having spaced spring clips 58 mounted thereon, may be provided to support the bolt and the articles, such as those indicated at 56, which are to be joined thereby. The support 57 has an integral arm 60 merging into a sleeve portion 61, the latter being disposed concentric with and adjustably secured to a vertical rod 62 by a set screw 63. The rod 62 is slidably mounted in suitable bearings 64 and 65 in the bracket 13 and has its lower end operatively connected to a foot lever 67 through the aid of a link 68. The lever 67 is pivoted, at 69, to a bracket 70, the latter being mounted upon any suitable stationary support (not shown). A spring 71, having its lower end connected to the foot lever 67 and is upper end connected to a lug integral with the arm 40 of the bracket 13, normally urges the lever upwardly or clockwise about its pivot.

In operation the bolt 26 is disposed with the articles 56 between the clips 58. The support 57 with the clips 58 is constructed so as to align the bolt with the centering element as nearly as is possible. The apertures in the articles through which the bolt extends usually allow a clearance, which makes it impossible to definitely locate the bolt in direct alignment with the nut and/or the washer, the latter being indicated at 73 in Fig. 3, without the assistance of a centering means. The centering means in this instance is the centering element 23 held against movement with respect to the wrench along a fixed line and provided with an outer end of a contour conditioned to interengage the bolt. The end of the bolt in the embodiment shown in Figs. 1, 2 and 3 is, therefore, provided with a conical recess 74 to receive the end 25 of the centering element when moved into engagement therewith. This interengagement of the bolt with the centering element will cause the bolt to move laterally with respect to its support any definite distance necessary to accurately center and align the bolt with the nut mounted in the wrench.

The bolt is brought into engagement with the centering element by the application of sufficient pressure on the foot lever 67 to move the rod 62 downwardly against the force of the spring 71 until the approaching end of the bolt 26 engages the centering element, at which time the vertex of the conical end 25 will hunt the centering point of the recess 74 in the bolt, centering and aligning the bolt with the nut. Continued downward movement of the foot lever will cause the bolt to move the centering element downwardly against the force of the spring 28, causing movement of the end of the bolt through the washer 73 and in engagement with the nut. Still further movement of the foot lever downwardly will cause downward movement of the wrench relative to its bearing 11, moving the lever 38 counterclockwise and causing interengagement of the teeth 46 and 47 of the clutch 44 to operatively connect the wrench with the rotating means, namely the motor 51, which drives the driving member 48 constantly during the operation of the machine. The downward movement of the wrench compresses spring 49 to form the interconnection of the teeth 46 and 47 of the clutch, which connection will be maintained until the nut has been driven on the bolt through the rotation of the wrench and until the nut is made sufficiently tight on the bolt to cause the teeth 46 and 47 of the clutch to slip under the pressure of the spring 49. The operation has thus been completed and the various parts may be returned to their normal positions by releasing the foot lever 67.

It will, therefore, be apparent that a nut and washer may be disposed in the recess 19 of the wrench and that the wrench and the bolt may be moved relative to each other and during this movement means, such as the centering element with its outer end of a contour for interengagement with the bolt, will center and align the bolt with the washer and the nut so that the nut may be driven on the bolt through relative rotation of the wrench and the bolt without damage to either the bolt or the nut.

In Fig. 4 another species of the invention is shown which is identical to the species shown in Figs. 1, 2 and 3 excepting the interengaging contours of the centering element and the bolt. In this species the wrench is indicated at 110, having a recess in its upper end to receive a nut 119. A locating element 123 in this embodiment is provided with a conical recess 125 conditioned to receive a conical end 174 of a bolt 126. It is apparent that with this variation in the structure the same centering and alignment effect will result.

The embodiments of the invention herein disclosed are merely illustrative and may be widely modified and departed from in many ways without departing from the spirit and scope of the invention as pointed out in and limited solely by the appended claims.

What is claimed is:

1. An assembling machine comprising a wrench recessed to receive a nut, a centering element with an outer end extending through the threaded portion of the nut and of a contour to interengage a bolt and mounted in the wrench for longitudinal movement only in alignment with the center of the nut to assure centering of the bolt with the nut, an element to removably hold the bolt, means to cause relative movement of the wrench and the holding element to render the centering element effective to center the bolt and nut, and means to cause rotation of the wrench to drive the nut on the bolt.

2. In a wrench, an element slidably mounted in the wrench and having a portion conditioned to extend through a nut and interengage a bolt, means to guide the element for longitudinal movement only in alignment with the center of the nut to assure centering of the bolt with the nut, and means to cause relative rotation of the bolt and nut to cause threaded interengagement thereof.

3. In an assembling machine, a wrench, an element mounted in the wrench and having a portion with a recess therein, adapted to extend through a nut and receive an end of a bolt in the recess, means to guide the element for longitudinal movement only in alignment with the center of the nut to assure centering of the bolt with the nut, and means to cause relative rotation of the bolt and nut to cause threaded interengagement thereof.

LOWELL J. MOELLER,